Nov. 17, 1970        A. A. DE LAURENTIS ET AL        3,540,120
METHOD OF CONSTRUCTING MAGNETIC CORE STRUCTURES
Filed Nov. 12, 1968                              7 Sheets-Sheet 1

WITNESSES
*Robert C. Baird*
*James F. Young*

INVENTORS
John C. Gumpper and
Angelo A. DeLaurentis.
BY
*Donald C. Lackey*
ATTORNEY

United States Patent Office 3,540,120
Patented Nov. 17, 1970

3,540,120
METHOD OF CONSTRUCTING MAGNETIC CORE STRUCTURES
Angelo A. De Laurentis, Sharpsville, and John C. Gumpper, Jamestown, Pa., assignors to Westinghouse Electric Corporation, Pittsburgh, Pa., a corporation of Pennsylvania
Filed Nov. 12, 1968, Ser. No. 774,941
Int. Cl. H01f 7/06
U.S. Cl. 29—609
18 Claims

ABSTRACT OF THE DISCLOSURE

A magnetic core structure of the stacked type having a plurality of like dimensioned layers of laminations which are superposed with their edges in alignment, to provide a magnetic core having square inner and outer corners with no voids or protrusions. The corner joints between the leg and yoke portions are of the stepped-lap type, having at least three successive steps in one direction before the direction is changed or the pattern repeated. A scrapless method for constructing this magnetic core is also disclosed which includes the steps of providing a plurality of spaced dies, indexing a metallic strip in the dies, cutting the strip with the dies, and indexing certain of the dies transverse to the indexing direction of the metallic strip, each time the laminations for a complete layer of the magnetic core are obtained.

BACKGROUND OF THE INVENTION

Field of the invention

The invention relates in general to new and improved magnetic core structures for electrical inductive apparatus, such as transformers and reactors, and to new and improved methods for constructing same.

Description of the prior art

United States Pat. No. 3,153,215, issued Oct. 13, 1964, which is assigned to the same assignee as the present application, discloses magnetic core structures of the stacked type which have stepped-lap joints between the mitered ends of the leg and yoke portions of the magnetic core. In a stepped-lap joint, the joints between the mitered or diagonally cut ends of the leg and yoke laminations, in each layer of the laminations, are incrementally offset from similarly located joints in adjacent layers in a predetermined stepped or progressive pattern, with the joints being stepped at least three times in one direction before the direction is changed or the pattern repeated. The stepped-lap joint was found to substantially improve the performance of a magnetic core, compared with magnetic cores which utilize the conventional butt-lap type joint, lowering the core losses, lowering the exciting volt-ampere requirements, and lowering the sound level of the magnetic core. Further, the hereinbefore mentioned patent disclosed the incremental clipping of at least one of the mitered ends of each of the laminations, which automatically steps the laminations of a stack of laminations when the clipped ends of the stack are aligned against a common plane surface. Thus, the laminations do not have to be individually stacked manually to produce the desired joint, but may be automatically stacked in groups, which reduces the manufacturing time and thus the cost of the magnetic core.

While the stepped-lap joint configuration disclosed in the hereinbefore mentioned patent is a significant advance in the art, it has the disadvantage of producing voids at the inner corners of the magnetic core, which raises the flux density at the inner corners above the average flux density of the magnetic core. This becomes especially important on larger magnetic cores, such as those used in power transformers, where it would be desirable to increase the step increment, in order to increase the mechanical strength of the magnetic core, and also in order to provide a greater tolerance in the stacking of the magnetic core without affecting the performance of the magnetic core. Increasing the step increment increases the voids or spaces at the inner corners of the magnetic core produced by the stepped laminations, where the leg and yoke portions of the magnetic core intersect. The effect of the voids at the inner corners of the core may be diminished, as taught by U.S. Patent No. 2,628,273, whereby the laminations are slit a predetermined number of times adjacent their end portions, parallel with the longitudinal dimension of the laminations, in order to force the flux away from the inner corners; or, as taught by copending application Ser. No. 685,558, filed Nov. 24, 1967, now U.S. Patent No. 3,477,053 which is assigned to the same assignee as the present application, the voids may be balanced between the inner and outer corners, thus reducing the void volume at the inner corners by 50% while increasing the diagonal joint area. It would be desirable, however, to provide a magnetic core having stepped-lap joints, at least at the outer corners of the magnetic core, without any voids being produced at the inner or outer corners.

The incremental clipping of the mitered ends of the laminations disclosed by the hereinbefore mentioned U.S. Patent No. 3,153,215, which facilitate the stacking of the laminations by automatically producing the stepped relationship of the mitered edges of the laminations, requires an extra manufacturing operation, and also produces scrap. If the lamination ends are not clipped, they protrude outwardly from the major outer surfaces of the magnetic core, where they may interfere with the end frames and other manufacturing operations. Further, the double diagonal cuts on the ends of the laminations which form the intermediate leg portion, produces a substantial amount of scrap, as well as requiring an additional manufacturing step to obtain the double diagonal cut. Thus, it would be desirable to provide a new and improved method of manufacturing a stacked magnetic core which has stepped-lap joints, at least between the outer legs and yoke portions of the magnetic core, which has square inner and outer corners without voids or protrusions, and which automatically provides the incremental clip or cut on at least one end of each of the laminations, without requiring an additional manufacturing step, and without producing scrap. Further, it would be desirable to provide all of the laminations for each layer in closed sequence from a single strip of metallic material, without scrap, even on the cores which have an intermediate leg portion. This would eliminate gauge problems in the stacking of the laminations, which are experienced when laminations are provided for each layer from different strips of metallic material.

SUMMARY OF THE INVENTION

Briefly, the present invention discloses a new and improved magnetic core structure of the stacked type, having stepped-lap joints, at least between the outer leg and yoke portions, while achieving square inner and outer corners without voids or protrusions. Further, each lamination has an edge at one end thereof which is perpendicular to a side of the lamination, which edge may be used while assembling the stacked portions or members of the core to automatically align the mitered edges of the laminations into the desired stepped pattern, by butting the perpendicular surface or ends of the laminations against a plane surface.

The invention also discloses a new and improved method of constructing this new magnetic core, which scraplessly produces the laminations for each layer of the core from a strip of metallic material in closed sequence, while automatically providing an edge at one end thereof for aligning the laminations into the stepped pattern. Since all of the laminations are produced from the same metallic strip in closed sequence, gauge problems in stacking are completely eliminated. The metallic strip is indexed into a plurality of spaced dies, and the laminations are cut. The steps of indexing and cutting the strip are repeated, if necessary, until all of the laminations for a layer of the magnetic core are obtained, and then certain of the dies are indexed transverse to the indexing direction of the strip, and the laminations for the next layer are produced. The indexing of the dies provides the step increment of the stepped lap joint, with the indexing of the dies continuing from layer to layer in a predetermined sequence, according to the predetermined stepped-lap pattern desired.

BRIEF DESCRIPTION OF THE DRAWINGS

Further advantages of the invention will become more apparent when considered in view of the following detailed description and drawings, in which.

DESCRIPTION OF THE PREFERRED EMBODIMENTS

Figure 1:
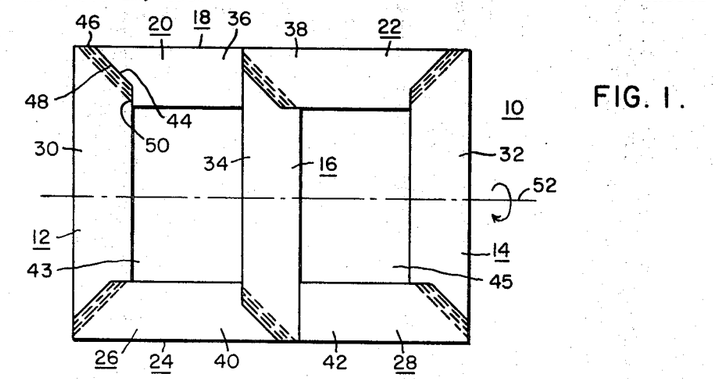
FIG. 1 is an elevational view of a group of stacked layers of laminations which define the leg and yoke portions of a three-phase magnetic core of the core-form type, which embody the teachings of the invention.

Referring now to the drawings, and FIG. 1 in particular, there is shown an elevational view of a group 10 of stacked layers of assembled laminations, which define the yoke and leg portions of a three-phase magnetic core of the core-form type, which embody the teachings of the invention. In this three-phase embodiment of the invention, the group 10 of stacked layers includes first and second outer leg portions 12 and 14, respectively, a third or intermediate leg portion 16, an upper yoke portion 18 which is split or divided into first and second sections 20 and 22, respectively, and a lower yoke portion 24 which is split into first and second sections 26 and 28, respectively. Each layer of the groups includes seven laminations, including first and second outer leg laminations 30 and 32, respectively, a third or intermediate leg lamination 34, first and second upper yoke laminations 36 and 38, respectively, and first and second lower yoke laminations 40 and 42, respectively. The laminations are cut from a strip of magnetic, metallic material, such as cold rolled silicon steel, having at least one preferred direction of magnetic orientation.

Each of the layers of laminations have like dimensions, each defining a rectangular outer configuration having straight sides, and each defining first and second windows or coil openings 43 and 45, respectively, which are rectangular in configuration with straight sides. The like dimension layers are superposed or stacked in exact registry, such that the outer and inner edges are aligned with the outer and inner edges of all of the other layers of the group, to provide a group which has no voids at the inner and outer corners of the core and no protrusions which extend past the rectangular outer configuration of the core.

All of the joints between the outer leg and yoke portions are of the mitered stepped-lap type, with the ends of the yoke and outer leg laminations which meet being cut diagonally with respect to its longitudinal dimension. usually at an angle of 45 degrees, to allow the outer leg and yoke laminations to butt together in a diagonal joint, which reduces the losses of the core. The stepped-lap joint incrementally offsets similarly located joints of the core from layer to layer, with the joints progressing at least three times in a predetermined direction before repeating the pattern or changing the direction. When a pattern has been completed, the laminations which make up the pattern are referred to as a group. The complete magnetic core then has as many superposed groups as required to provide the build or stack dimension of the magnetic core. As will be hereinafter explained, a pattern may step all of the joints in a single direction, or it may move incrementally in one direction and then move incrementally in the opposite direction.

Instead of diagonally cutting the laminations such that the diagonal cut intersects both sides of the laminations, which would produce voids at the inner corners of the magnetic core with a stepped-lap type joint and consequent flux crowding due to the natural tendency of the flux to hug the inner corners of the core, each end of the meeting outer leg and yoke laminations is cut such that the diagonal edge intersects only one side of the lamination, intersecting an edge near the other side of the lamination which is perpendicular to that other side. Further, in any two joining outer leg and yoke laminations, the perpendicular edge appears at opposite ends of the diagonal cut edges of the joining laminations. For example, in the corner joint formed between outer leg lamination 30 and the first upper yoke lamination 36, lamination 30 has a diagonal cut 44 which proceeds inwardly from a perpendicular edge 46 located at the extreme end of the lamination 30, and lamination 36 has a diagonal cut 48 which proceeds outwardly from a perpendicular edge 50 located a predetermined distance from the end of lamination 36. Thus, the perpendicular edge 46 forms a part of the outer edge of the group 10, while perpendicular edge 50 forms part of the corner joint, being butted against a portion of the side of lamination 30. This type of joint, since it includes two connected portions, is referred to as a composite joint. The remaining joints between the outer leg and yoke laminations are also composite joints, for example the joints between leg lamination 30 and yoke lamination 40, between leg lamination 32 and yoke lamination 38, and the joint between leg lamination 32 and yoke lamination 42.

Figure 2:
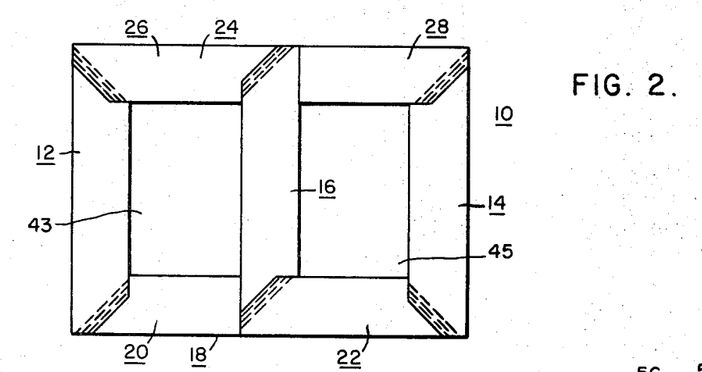
FIG. 2 is an elevational view of the group of laminations shown in FIG. 1, rotated 180 degrees about a horizontal center line through the group of laminations.
Figure 13:
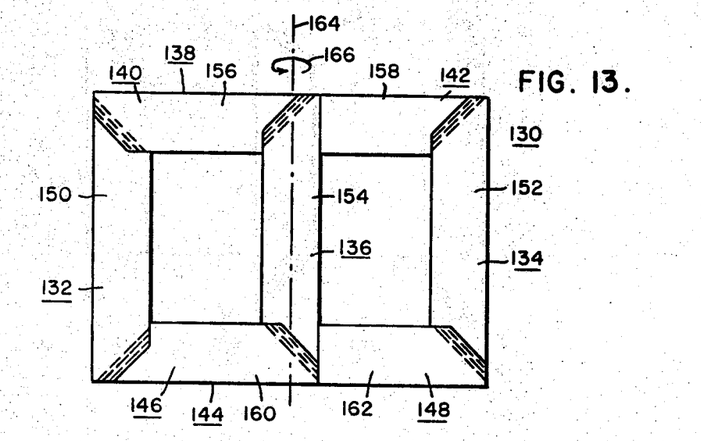
FIG. 13 is an elevational view of a group of stacked layers of laminations, which illustrate another embodiment of the invention.

It will be noted from FIG. 1 that the joint between leg lamination 30 and yoke lamination 36 appears in the yoke, the joint between leg lamination 30 and yoke lamination 40 appears in the leg, the joint between leg lamination 32 and yoke lamination 38 appears in the yoke, and the joint between leg lamination 32 and yoke lamination 42 appears in the leg. Whether or not a particular joint appears in the yoke or leg portion of the core is not critical, but it is important that some of the joints appear in the leg and some in the yoke for the following reasons. First, it is necessary that each lamination have a perpendicular edge at one end that may be used to align all of the laminations of its associated stack portion, to automatically provide the desired stepped relation for their diagonally cut ends. Second, with a three-phase magnetic core having an intermediate leg configuration constructed according to the invention, as will be hereinafter explained, it is necessary to reverse alternate groups of laminations across the magnetic core, in order to change the location of a certain joint from group-to-group, which joint is not a stepped-lap joint. Since the groups of laminations must be reversed, it will provide a mechanically stronger magnetic core having lower losses if the stepped-lap joints are alternated from leg to yoke across the magnetic core from group-to-group. FIG. 1 illustrates an embodiment of the invention where the groups of laminations are reversed by rotating the laminations 180 degrees about an axis 52 which is perpendicular to the leg portions 12, 14 and 16. Thus, the stepped-lap joint may be alternated between the leg and yoke portions by arranging the stepped-lap joint to appear in the upper yoke portions 20 and 22, and in the outer leg portions 12 and 14, adjacent the lower yoke portions 26 and 28. FIG. 2 illustrates the group 10 shown in FIG. 1, after the group 10 of FIG. 1 has been rotated 180 degrees about axis 52. The location of the joints between the outer leg and yoke laminations could also be as shown in FIG. 13, and the group 10 rotated about an axis which coincides with the longitudinal axis of the intermediate leg portion 16, with similar results.

The inner leg portion 16, in this embodiment of the invention, has substantially the shape of a parallelogram, having diagonally cut ends which are parallel with each other. Like the outer leg laminations, the diagonal cuts do not intersect both sides of the laminations. The diagonal cuts start from the same edge of the lamination and intersect an edge which is perpendicular to the other side of the lamination. The diagonal cuts on the inner leg laminations 34 join yoke laminations 40 and 38, and these joints are stepped from layer to layer similar to the stepped-lap pattern at the outer corner joints of the core. The joint between inner leg lamination 34 and yoke lamination 36 is not stepped from layer to layer of the group, but are all aligned. In like manner, the joint between inner leg lamination 34 and yoke lamination 42 is aligned with similar joints in the other layers of the group. Thus, it is important in the three-phase embodiment, to reverse alternate groups of laminations across the magnetic core, in order to distribute this common group joint to different locations in the core.

The inner leg lamination has a single diagonal cut, instead of the conventional double diagonal cut, as the double diagonal cut complicates automatic shearing of the laminations, and it produces 4 to 10% scrap, with the amount of scrap depending upon the core design. The single diagonal cut allows the core to be constructed without scrap, as will be hereinafter described.

The laminations of the inner leg 16 extend completely to the outer surface of yoke portion 24, which spaces the yoke portions 26 and 28 from one another. On the other hand, the other ends of the laminations of the inner leg 16 extend only partially through yoke portion 18. This enables a squared end to be provide on one end of the laminations for yoke portion 22.

The joints of the succeeding layers of laminations are shown with dotted lines in FIG. 1, with the stepped-lap joints being illustrated as falling along four different planes for purposes of example. In actual practice, a larger number of joint planes may be utilized per group.

Figure 3:
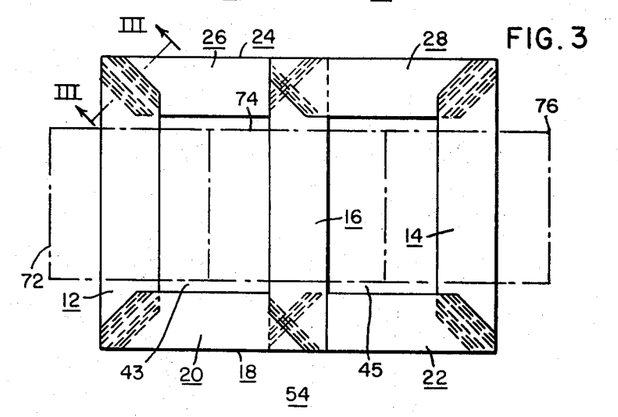
FIG. 3 is an elevational view of the magnetic core formed by the groups of laminations shown in FIGS. 1 and 2, with the group shown in FIG. 1 being superposed on the group shown in FIG. 2.
Figure 4:
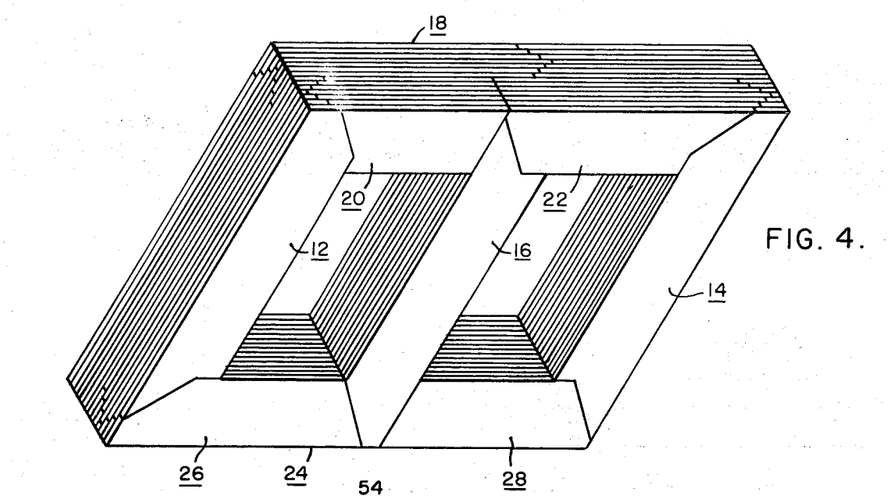
FIG. 4 is a perspective view of the magnetic core shown in FIG. 3.

As hereinbefore described, FIG. 2 illustrates the group 10 of laminations shown in FIG. 1, as it would appear when rotated 180° about a horizontal axis 52. A magnetic core would be constructed by stacking the required number of groups 10, with alternate groups being as shown in FIG. 1, and the remaining groups being as shown in FIG. 2. FIG. 3 is an elevational view of a magnetic core constructed by superposing the groups of FIGS. 1 and 2, and FIG. 4 is a perspective view of the magnetic core 54 shown in FIG. 3. Like reference numerals shown in FIGS. 1, 2, 3 and 4, as well as in the remaining figures, indicate like components.

It will be noted from observing FIGS. 3 and 4, that the stepped-lap joints at the outer corners alternate between the yoke and leg portions of the core from group-to-group, and that the joints between the intermediate leg portion 16 and the yoke portions 18 and 24 are distributed to a different location in the core from group-to-group, with the stepped-lap portion of the joint of one group being perpendicular to the stepped-lap portion of the joint of the next group, and with the butt joint being directed to two spaced locations in the yoke portions of the core.

It should also be noted that while the stepped-lap pattern appears in both the yoke and leg portions of the core, that the basic stepped-lap pattern of a group never progresses around the corner of the core. This is important, as it allows all of the laminations of a group to be stacked with their perpendicularly cut ends adjacent a plane surface, to align their diagonally cut ends in a stepped pattern. Thus, the whole group of stacked laminations may be handled together and placed in the core during assembly, without handling the laminations individually.

Figure 3A:
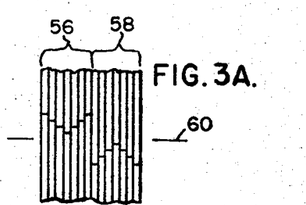
FIGS. 3A and 3B are cross-sectional views of a corner of the magnetic core shown in FIG. 3, taken along the line III—III, which illustrates two stepped-lap joint patterns which may be used.

FIG. 3A is a cross-sectional view of the upper left corner of the magnetic core 5b, taken along the line III—III, which illustrates two groups of laminations 56 and 58, with group 56 having a stepped-lap joint disposed on one side of the corner, represented by line 60, and with group 58 having a stepped-lap joint disposed on the other side of corner 60. In this embodiment, the stepped-lap pattern is incrementally stepped in one direction, and then is incrementally stepped back to the starting position.

Figure 3B:
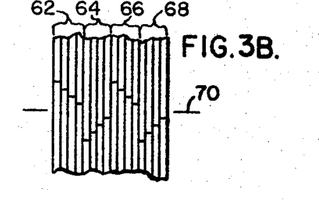

FIG. 3B is a cross-sectional view of the upper left corner of the magnetic core 54, taken along the line III—III, which illustrates four groups of laminations 62, 64, 66 and 68, with alternate groups 62 and 66 having stepped-lap joints disposed on one side of the corner, represented by line 70, and the remaining groups 64 and 68 having stepped-lap joints disposed on the other side of the corner 70. In this embodiment, the stepped-lap pattern is incrementally stepped in only one direction.

As illustrated in FIG. 3, electrical windings 72, 74 and 76, shown in phantom, are disposed on winding legs 12, 16 and 14, respectively, in the usual core-form construction.

FIG. 4 clearly illustrates the square inner and outer corners of the magnetic core 54, without any voids or protrusions, and also the excellent joint distribution which reduces the losses, the excitation requirements, and the sound level of the core, compared with prior art cores.

Figures 5, 6:
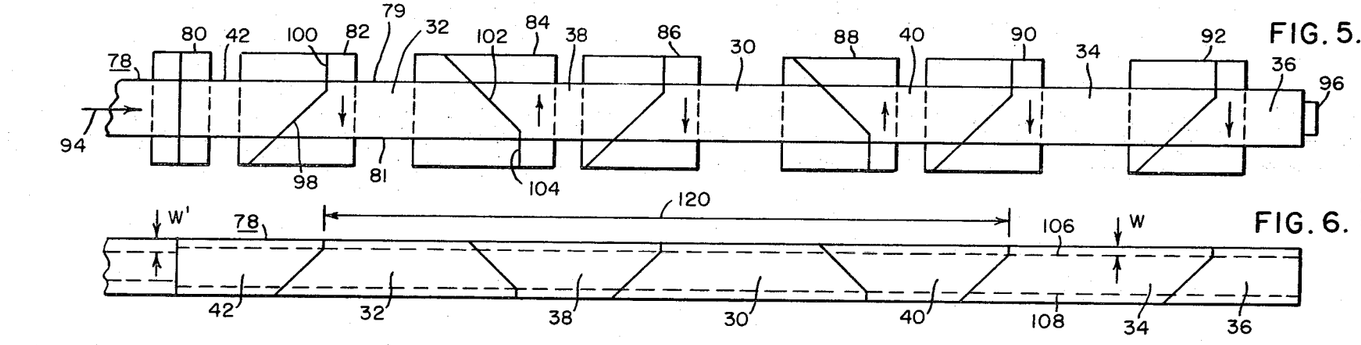
FIG. 5 is a plan view of a die arrangement for scraplessly cutting the laminations for the magnetic core shown in FIG. 3, according to the teachings of the invention.
FIG. 6 is a plan view of the laminations after they are cut by the die arrangement shown in FIG. 5.

The magnetic core 54 shown in FIGS. 3 and 4 may be made completely without scrap according to an embodiment of the invention shown in FIG. 5. FIG. 5 illustrates how all seven laminations for a layer of the magnetic core 54 may be provided at one time, from a single strip 78 of metallic material having sides 79 and 81. The first step of the method is to provide seven dies 80, 82, 84, 86, 88, 90 and 92, and arrange them in spaced aligned relation such that the strip 78 may be linearly indexed into the dies. The dies may be simultaneously operated by a plurality of presses disposed on a common base, or they may be cyclically or manually operated. The laminations for a single layer of the magnetic core are provided in closed sequence, with the trailing edge of one lamination having the same configuration as the leading edge of the next lamination. Thus, each layer of the magnetic core may be stacked without gauge problems, as all of the laminations are from the same metallic strip. Using the reference numerals for the laminations of the first layer of the group 10 shown in FIG. 1, the dies are arranged to cut the laminations from the strip 78 in the sequence of the yoke lamination 36, the intermediate leg lamination 34, the yoke lamination 40, the leg lamination 30, the yoke lamination 38, the leg lamination 32, and the yoke lamination 42. The strip 78 is indexed into the dies in the direction of arrow 94, until reaching a retractable stop 96, or as determined by suitable strip metering means, and the dies are actuated to provide the seven laminations required for a complete layer of the magnetic core 54. It will be noted that die 80 makes a straight cut perpendicular to the sides of the strip, and that lamination 36 requires a straight leading edge perpendicular to the sides of the strip. Thus, each time a layer of laminations is cut, the edge of the strip cut by die 80 may be indexed to the stop 96. It will also be noted that each of the remaining dies make a composite cut, which includes a cut diagonal to the sides of the strip, and a cut perpendicular to a side of the strip. For example, die 80 is constructed to make a diagonal cut along the line 98, which intersects side 81 of strip 78, and also a cut which intersects and is perpendicular to side 79 of the strip 78, along the line 100. Die 84, on the other hand, is constructed to make a diagonal cut along line 102, which intersects side 79 of the strip 78, and also a cut which intersects and is perpendicular to the side 81 of the strip 78, along a line 104. Of the remaining dies, dies 86, 90 and 92 are arranged similar to die 82, and die 88 is arranged similar to die 84. All of the dies are spaced as dictated by the length of the laminations, and all are located transverse to the strip such that each will produce the same length of cut perpendicular to an edge of the strip.

FIG. 6 illustrates the metallic strip 78 after the seven laminations for a layer of the magnetic core 54 have been cut. The dotted lines 106 and 108 intersect the apex of the angles formed by the intersecting diagonal and perpendicular edges at the end or ends of the laminations, with the distance W between a dotted line and the adjacent side of the lamination indicating the length of the perpendicular cut on each of the laminations.

After the metallic strip 78 has been indexed into the dies, as shown in FIG. 5, and the seven laminations for a core layer have been cut, as shown in FIG. 6, the strip 78 is again advanced or indexed into the dies against stop 96. However, instead of cutting the next layer of laminations, which would produce laminations having exactly the same dimensions as those just produced, all of the dies, except die 80, are indexed transverse to the sides of the strip 78, which is thus transverse to the indexing direction of the strip. The die indexing increment depends upon the overlap desired in the stepped-lap joint pattern. In distribution type transformer cores, the indexing increment may be ⅛ of an inch, while in power transformer type magnetic cores, the increment may be ¼ inch. All of the dies are indexed the same amount. However, it is important to note that all of the dies are not indexed in the same direction. Dies 82, 86, 90 and 92 are indexed in the same direction, and dies 84 and 88 are indexed in the opposite direction, as indicated by the arrows shown on the dies. Thus, each time a layer of laminations is cut from the strip, the indexable dies are indexed, prior to the cutting of the next layer of laminations. If the stepped-lap pattern is of the type which progresses in only one direction, as shown in FIG. 3B, the dies will be indexed until reaching the desired number of steps, and then the dies will return to their starting position, to start the next group of laminations. If the stepped-lap pattern progresses incrementally in both directions, as shown in FIG. 3A, the dies will index inwardly the desired number of steps, and then index outwardly to the starting position, to create one basic stepped-lap pattern.

Figure 8:
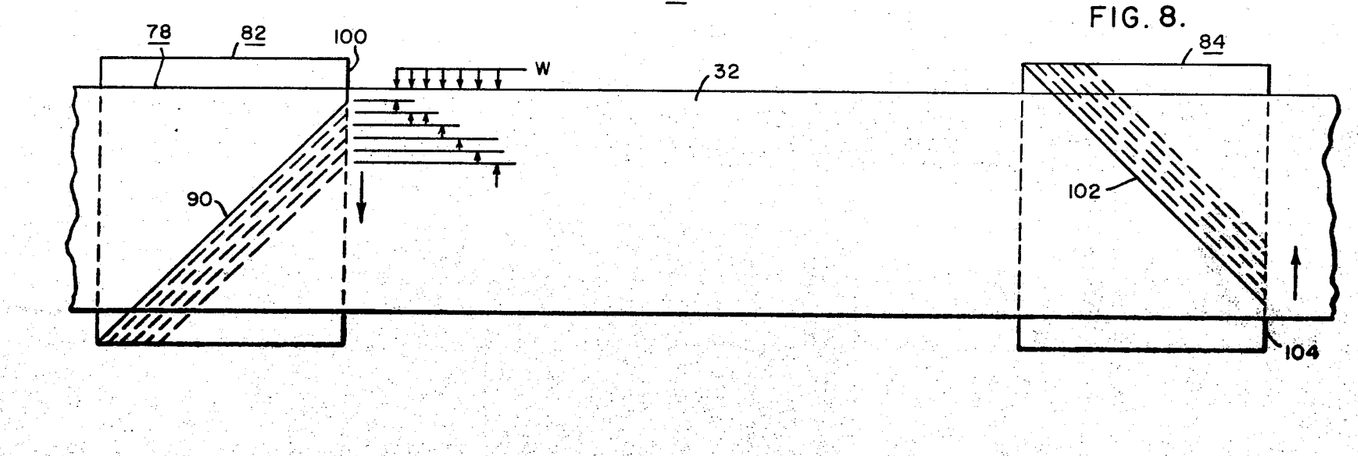
FIG. 8 is an enlarged view of one of the laminations shown in FIGS. 6 and 7, illustrating how incrementally indexing the dies shown in FIG. 5 will change the dimensions of the laminations.

FIG. 8 is an enlarged view of lamination 32, which is cut by dies 82 and 84, as shown in FIG. 5. FIG. 8 illustrates more clearly the indexing positions of the dies 82 and 84. It will be noted that the perpendicular portion of the cut does not change position relative to the longitudinal dimension of the strip 78, merely changing its dimension W. Thus, by placing the perpendicular cuts against a plane surface, it is readily apparent that the laminations will automatically align their diagonal cuts into a stepped pattern. Further, instead of incrementally clipping the ends to obtain the incremental changing of the perpendicular cuts, which would involve an additional operation as well as producing scrap, the incremental perpendicular cuts are obtained during the cutting of the laminations, without scrap. Further, since the strip width does not change from layer to layer, and since all of the leading and trailing edges change dimensions together from layer to layer, each layer will fit together properly and each layer may be placed over the other layers without any overlapping of any kind. In other words, a solid magnetic core is constructed without voids or protrusions.

Figure 7:
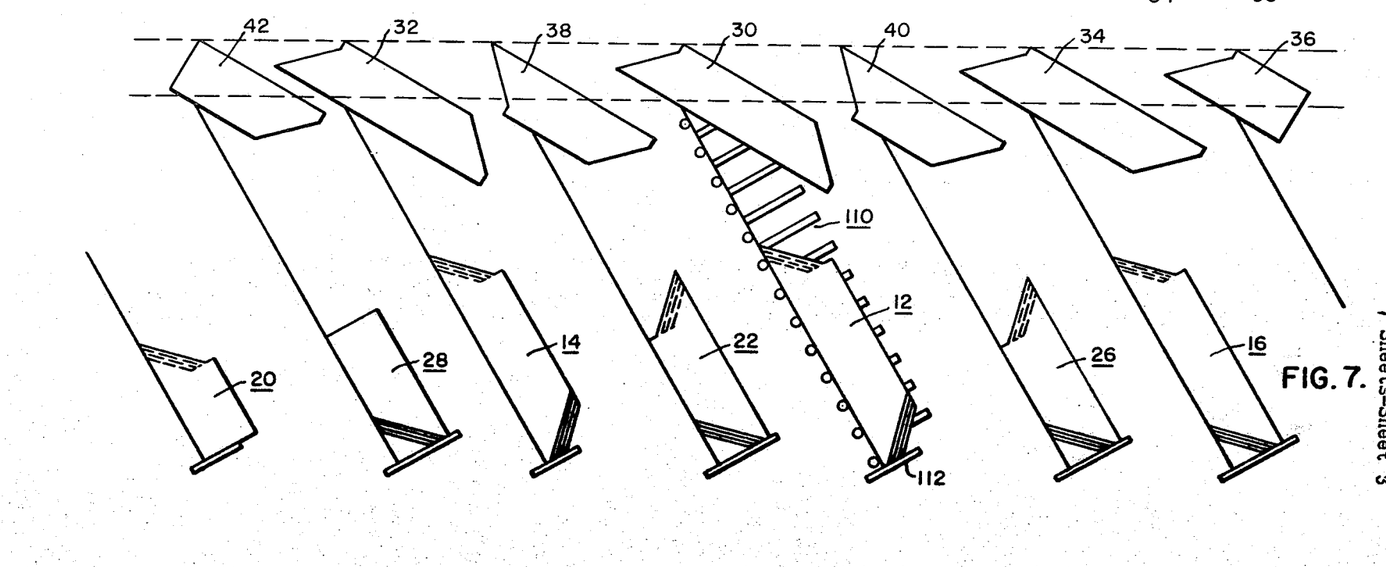
FIG. 7 is an elevational view illustrating how the cut laminations may be directed against a stop, to stack and automatically develop the stepped pattern for the mitered edges of the laminations.

It will be noted from FIG. 6 that all of the leading ends of the laminations have a portion which is perpendicular to the side of the strip. This facilitates automatic stacking of the laminations as they are cut, and each lamination may leave the dies with the same orientation. As shown in FIG. 7, each lamination may be ejected from the dies into a collector chute, which may include a V type roller arrangement 110, as illustrated for lamination 30. The laminations may be vibrated to move them against a sequence gate or stop 112, to automatically align their diagonal cuts into a stepped pattern, and at predetermined intervals the sequencing gate may allow the stack to process to a pickup chute for subsequent assembly in the core.

Figure 10:
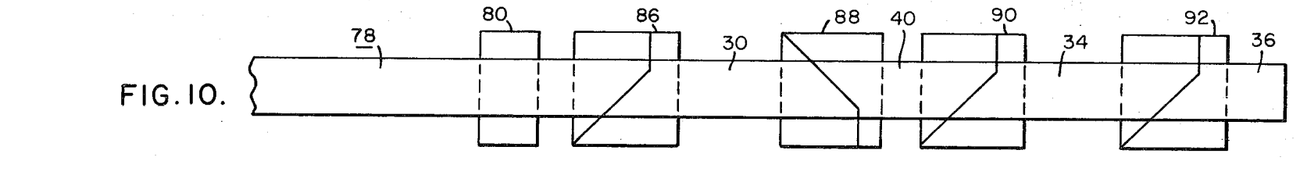
FIGS. 10 and 11 are plan views of a die arrangement for cutting the laminations from the strip shown in FIG. 9, in two steps, with FIGS. 10 and 11 illustrating the first and second strip indexing steps, respectively.
Figure 11:
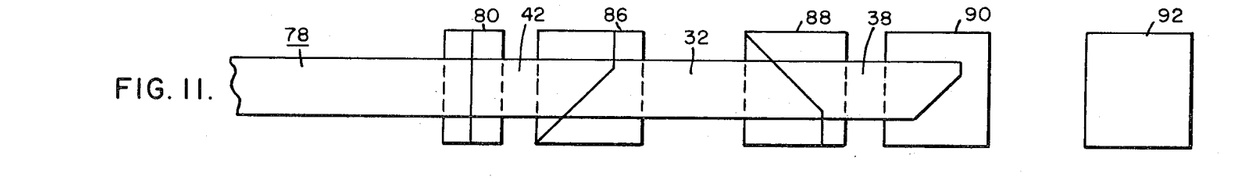

In the embodiment of the invention shown in FIG. 5, all seven laminations for the three-phase core 54 are provided with seven dies after a single indexing of the metallic strip, and the dies are indexed after each die operation. The laminations may also be provided by five dies, instead of seven, requiring the metallic strip to be indexed twice in order to complete each layer of laminations, and the dies, in this embodiment are not indexed until all of the layer laminations have been provided. This embodiment of the invention is shown in FIGS. 9, 10 and 11, with like reference numerals indicating like components.

Figure 9:
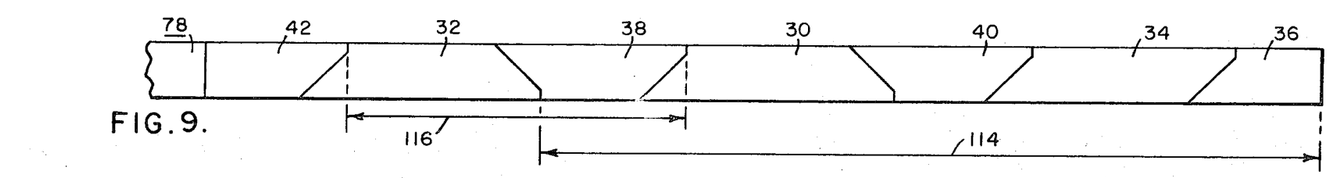
FIG. 9 is a plan view of a strip of metallic material which illustrates the lamination pattern and how the laminations for each layer of the core may be cut with fewer dies, using two unequal strip indexing steps.

FIG. 9 illustrates the metallic strip 78 with the lamination pattern shown thereon, and the two strip indexing dimensions 114 and 116 indicated. In this embodiment, the die arrangement is as shown in FIGS. 10 and 11, with dies 82 and 84 being eliminated, and die 80 being moved closer to die 86 to establish the dimension required for the lamination 42. The strip 78 starts with a squared leading edge, at die 80, and is indexed into the dies by the dimension 114 shown in FIG. 9, to occupy the position shown in FIG. 10. All of the dies are actuated, except die 80, to produce laminations 30, 40, 34 and 36. Then the strip 78 is indexed by the dimension 116 shown in FIG. 9, which is less than the indexing dimension 114, to cause the strip to occupy the position shown in FIG. 11. Dies 80, 86 and 88 are then actuated to cut laminations 42, 32 and 38. A cycled lamination divider may be included to separate laminations 40 from laminations 38, and laminations 30 from laminations 32, after they are cut. This completes the seven laminations required for a complete layer of the magnetic core, and all of the dies, except die 80, are indexed transverse to the strip direction, to prepare for the next layer of laminations.

Figure 12:
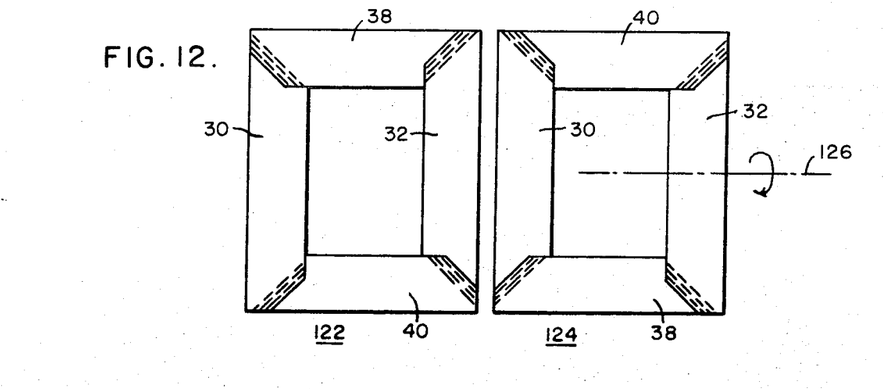
FIG. 12 is an elevational view of two single-phase cores of the core-form type, or a plan view of a single-phase core of the shell form type, which may be constructed according to the teachings of the invention.

While a three-phase embodiment of the invention has been described, a single-phase magnetic core may also be produced, without modifying the equipment required for producing the three-phase core. A single-phase core may be provided by the four laminations 32, 38, 30 and 40, as encompassed by the line 120, shown in FIG. 6. This will require the operation of four dies, i.e., dies 82, 84, 86 and 88. The only scrap involved when constructing the laminations for a single-phase core will be when die 82 initially trims the square leading edge of the strip. The strip is then indexed into the four dies with its leading edge already properly cut to provide the leading edge of lamination 38. The four laminations may then be cut and the dies indexed transverse to the strip indexing direction, to prepare for the next layer of laminations. The laminations may be automatically stacked as hereinbefore explained in the three-phase embodiment. FIG. 12 illustrates either two single-phase cores 122 and 124 of the core-form type, each constructed with laminations 32, 38, 30 and 40, or the cores 122 and 124 may be placed in side-by-side relation to provide a single-phase core of the shell-form type. If the cores 122 and 124 are placed side-by-side to provide a single-phase core of the shell-form type, the individual core sections may be made in a similar manner, with core section 124 then being rotated 180 degrees about one of its axes, such as axis 126. Since the single-phase core has all diagonal stepped-lap joints, it is not essential that alternate groups be reversed across the core. However, reversing alternate groups to distribute the stepped-lap joints between the yoke and leg portions of the core, will result in a still better core performance.

Figure 14:
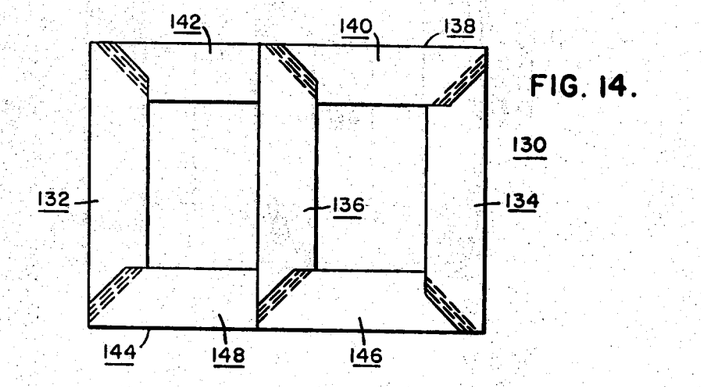
FIG. 14 is an elevational view of a group of laminations shown in FIG. 13, rotated 180 degrees about a vertical center line through the intermediate leg portion of the group.
Figure 15:
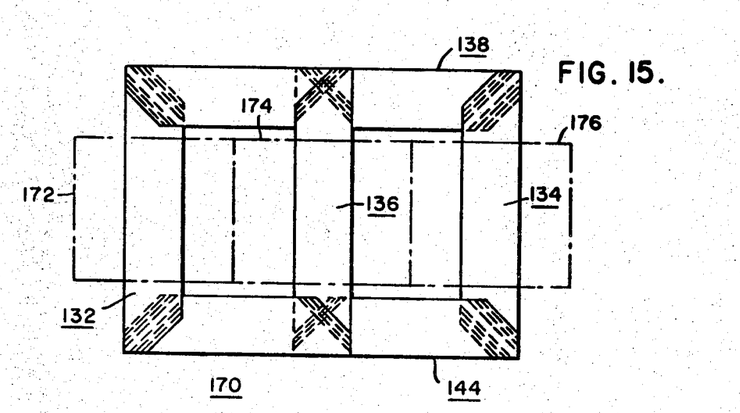
FIG. 15 is an elevational view of a magnetic core formed by the groups of laminations shown in FIGS. 13 and 14.

The three-phase embodiment of the invention shown in FIG. 3, utilizes an intermediate leg portion having laminations which are substantially parallelogram in configuration. The teachings of the invention also apply to three-phase magnetic cores having an intermediate leg portion which has a substantially trapezoidal configuration, similar to the outer leg portions. This embodiment of the invention is shown in FIGS. 13, 14 and 15. Specifically, FIG. 13 illustrates an elevational view of a group 130 of stacked layers of assembled laminations which define the yoke and leg portions of a three-phase magnetic core, which embody the teachings of another embodiment of the invention. In this embodiment of the invention, the group 130 of stacked layers includes first and second outer leg portions 132 and 134, respectively, a third or intermediate leg portion 136, an upper yoke portion 138 which is split or divided into first and second sections 140 and 142, respectively, and a lower yoke portion 144 which is split into first and second sections 146 and 148, respectively. Each layer of the group includes seven laminations, including first and second outer leg laminations 150 and 152, respectively, an intermediate leg lamination 154, first and second upper yoke laminations 156 and 158, respectively, and first and second lower yoke laminations 160 and 162, respectively. The laminations are cut from a strip of magnetic metallic material, such as cold rolled silicon steel.

Each of the layers of laminations has like dimensions, each defining a rectangular outer configuration having straight sides, and each defining coil openings which are rectangular in configuration with straight sides. The like dimensioned layers are superposed or stacked in exact registry, providing a solid structure with no voids at the inner and outer corners of the core, and no protrusions which extend past the rectangular outer configuration of the core.

All of the joints between the outer leg and yoke portions are of the diagonal stepped-lap type, as hereinbefore described relative to the group 10 shown in FIG. 1. Also, similar to the joints of the group 10 shown in FIG. 1, the joints at the outer corners of the group 130 are a composite joint, having a diagonal portion and a portion perpendicular to the side of a lamination.

The inner leg portion 136, in this embodiment of the invention, is substantially in the shape of a trapezoid, having diagonal cuts which intersect opposite sides of the lamination, and also intersect perpendicular edges, which edges intersect the remaining sides of the laminations. The diagonal cuts on the ends of the laminations 154 which make up the intermediate leg portion 136 join the yoke portions 140 and 148 with stepped-lap joints, while the joints between laminations 154 and 158 are all aligned in each group, and the joints between lamination 154 and yoke lamination 162 are all aligned in each group. Thus, it is important to reverse alternate groups across the core in order to distribute this common group joint to different locations in the core. Unlike the embodiment shown in FIGS. 1, 2 and 3, the groups cannot be reversed by rotating them 180 degrees about a horizontal axis which intersects all three legs of the core. With the trapezoidal shaped inner leg portion, the common joints between the intermediate leg and yoke portions both lie in the same plane. Therefore, in this embodiment of the invention it is necessary to reverse alternate sections by rotating the groups to be reversed 180° about a vertical center line through the intermediate leg portion, such as about an axis 164, as illustrated by arrow 166. FIG. 14 illustrates the group 130 shown in FIG. 13, after it has been rotated 180 degrees about the vertical axis 164.

FIG. 15 illustrates a magnetic core 170, constructed with alternate groups as shown in FIG. 13, and the remaining groups of laminations as shown in FIG. 14. Windings 172, 174, and 176, shown in phantom, will be disposed about the leg portions 132, 136 and 134, respectively, of the magnetic core, in line with conventional core-form construction. It will be noted from FIG. 15 that the stepped-lap joints at the outer corners of the core 170 alternate between the leg and yoke portions of the core, that the stepped-lap joints between the intermediate leg portion and the yoke portions are disposed at right angles to one another, and that the common group joint location is changed from group-to-group, across the magnetic core.

Figure 16:
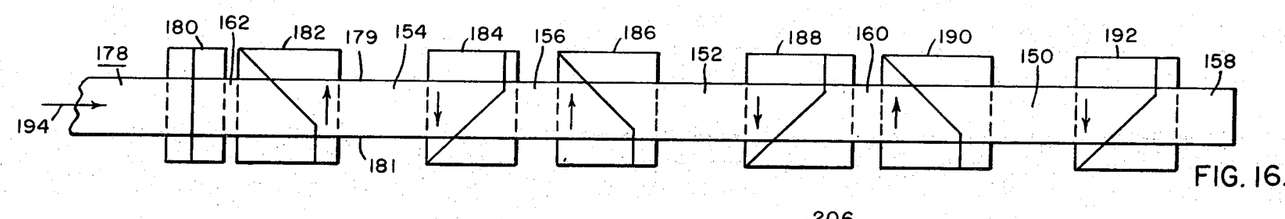
FIG. 16 is a plan view of a die arrangement for scraplessly cutting the laminations for the magnetic core shown in FIG. 15, according to the teachings of the invention.
Figures 17, 18:
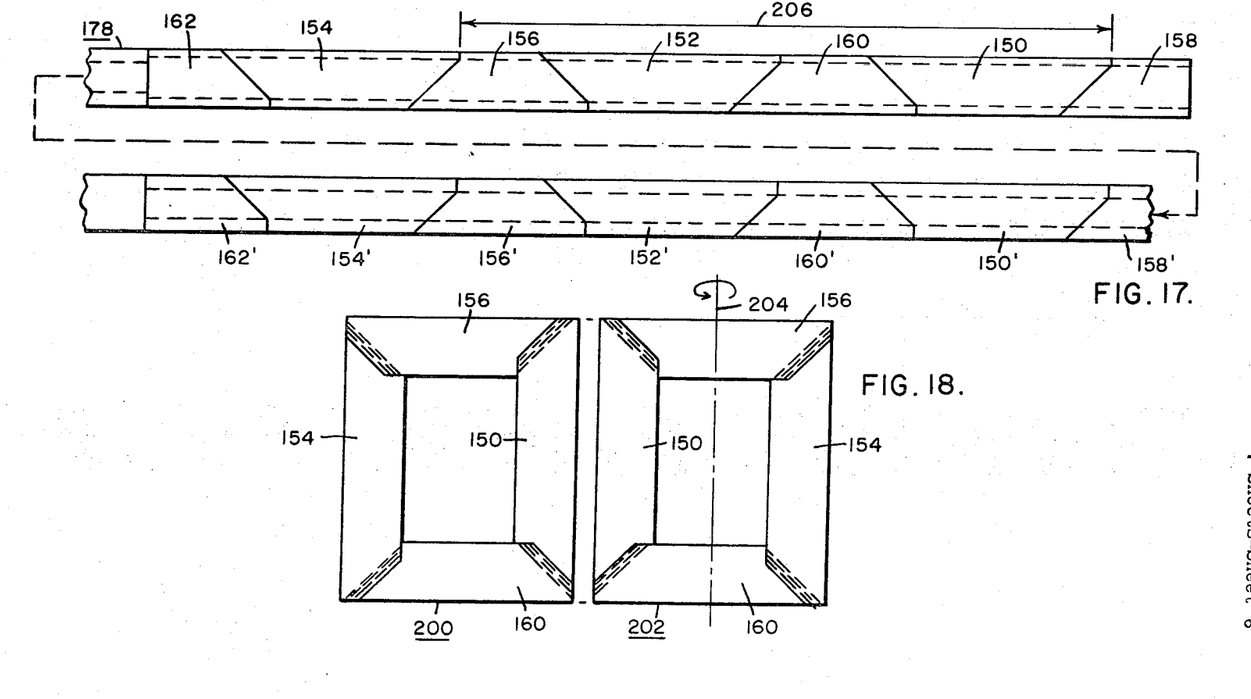
FIG. 17 is a plan view of the laminations after they are cut by the die arrangement shown in FIG. 16.
FIG. 18 is an elevational view of two single-phase cores of the core-form type, or a plan view of a single-phase core of the shell-form type which may be constructed according to an embodiment of the invention.

The magnetic core 170 shown in FIG. 15 may be made completely without scrap according to an embodiment of the invention shown in FIG. 16. FIG. 16 illustrates how all seven laminations for a layer of the core 170 may be provided at one time from a single strip 178 of metallic material having sides 179 and 181. This method is similar to the method shown in FIGS. 5, 6 and 7, utilizing seven dies 180, 182, 184, 186, 188, 190 and 192 disposed in spaced aligned relation, such that the strip 78 may be indexed into the dies. The laminations for a single layer of the core 170 are provided in closed sequence, with the trailing edge of one lamination having the same configuration as the leading edge of the next lamination. Using the reference numerals for the laminations of the first layer of the group 130 shown in FIG. 13, the dies are arranged to cut the laminations from the strip 178 in the sequence of the yoke lamination 158, the leg lamination 150, the yoke lamination 160, the leg lamination 152, the yoke lamination 156, the leg lamination 154 and the yoke lamination 162. The strip 178 is indexed into the dies in the direction of arrow 194, until reaching a retractable stop, or as metered by suitable strip metering means, and the dies are actuated to provide the seven laminations required for a layer of the group 130. Die 180 makes a straight cut perpendicular to the sides of the strip 178, and the remaining dies make a composite cut as hereinbefore described relative to FIG. 5. Dies 182, 186 and 190 are arranged to provide similar cuts, while dies 184, 188 and 192 are arranged to provide similar cuts. All of the dies are spaced as dictated by the length of the laminations, and all are located transverse to the strip such that each will produce the same length of cut perpendicular to an edge of the strip. FIG. 17 illustrates the strip 178 after the seven laminations for a layer of the core have been cut, with the dotted lines indicating the dimension of the perpendicular cuts at the end or ends of the laminations. The dies 182, 186 and 190 are then indexed in the same direction, and dies 184, 188 and 192 are indexed in the opposite direction, and the laminations for the next layer of the core may be cut, as illustrated in FIG. 17, with the laminations for this layer being given the same reference numerals except with a prime mark. It will be noted that the distance between the dotted lines and the sides of the laminations is greater for this layer of laminations than it was for the previous layer. The steps of indexing the dies, indexing the strip, and cutting the strip with the dies, are repeated until the desired number of groups of laminations for the magnetic core 170 are provided. Like the embodiment of the invention shown in FIGS. 5 and 6, all of the leading edges of the laminations for the magnetic core 170 have a squared leading edge, which allows all of the laminations to leave the dies oriented in a similar manner, to be stacked against a plane surface to orient each stack of laminations into the desired stepped pattern.

As illustrated in FIG. 18, the equipment shown in FIG. 16 may be used to make the dies for a single-phase magnetic core, with the laminations 156, 152, 160 and 150, encompassed by line 206 in FIG. 17, being used to make the single phase core. FIG. 18 illustrates two magnetic core sections 200 and 202, with each section being a complete single-phase core of the core-form type; or each section may form one of the two portions of a single-phase core of the shell-form type. As illustrated in FIG. 18, one of the core sections may be reversed by rotating it 180 degrees about a perpendicular axis 204. Rotating magnetic core section 202 about axis 204 produces the magnetic core section 200.

Figure 19:
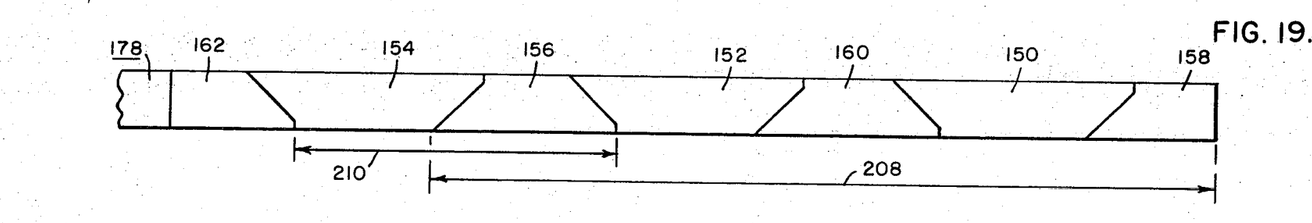
FIG. 19 is a plan view of a strip of metallic material which illustrates the lamination pattern and how the laminations for each layer of the core may be cut with fewer dies, using two unequal strip indexing steps.
Figure 20:
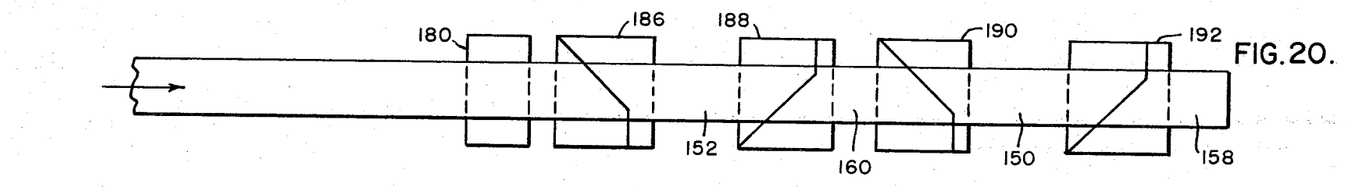
FIGS. 20 and 21 are plan views of a die arrangement for cutting the laminations from the strip shown in FIG. 19, in two steps, with FIGS. 20 and 21 illustrating the first and second strip indexing steps, respectively.
Figure 21:
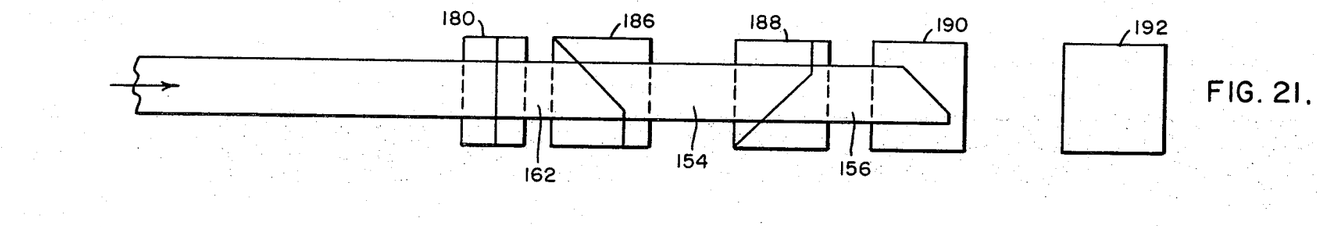

Like the magnetic core 54 shown in FIG. 3, the magnetic core 170 shown in FIG. 15 may also be constructed with five dies instead of the seven dies, which requires that the strip 178 be indexed twice before all of the laminations of a layer are obtained. FIG. 19 illustrates the strip 178 with the lamination pattern illustrated thereon, and the two strip indexing dimensions 208 and 210 also indicated. In this embodiment, dies 182 and 184 are not required, and die 180 is moved closer to die 186 to establish the dimension required for the lamination 162. The strip 178 starts with a squared end at die 180 and is indexed into the dies by the dimension 208 shown in FIG. 19, to occupy the position shown in FIG. 20. All of the dies are actuated except die 180 to produce laminations 152, 160, 150 and 158. Then the strip 178 is indexed by the dimension 210 shown in FIG. 19, which is less than the indexing dimension 208, with the strip then occupying the position shown in FIG. 21. Dies 180, 186 and 188 are then actuated to cut laminations 162, 154 and 156. Means for automatically separating laminations 160 from laminations 156 and laminations 152 from laminations 154, may be provided. This completes the seven laminations required for a layer, and all of the dies, except die 80 are indexed transverse to the strip direction, to prepare for the next layer of laminations.

In summary, there has been disclosed new and improved magnetic core structures, both single and three-phase, which have all distributed joints, with the majority of the joints being of the stepped-lap type. Further, the magnetic cores have straight outer sides without voids or protrusions, and the inner corners which define the coil openings are square, also without voids. Thus, the disclosed magnetic cores provide excellent performance from the standpoint of core losses, exciting volt-amperes, and sound level. Further, the disclosed magnetic cores may be manufactured by new and improved methods which eliminate scrap, eliminate stacking problems due to gauge differences in metallic strip, facilitates automatic stacking of the core leg and yoke portions, and enables all of the laminations to be cut without the necessity of setting up separate manufacturing steps for certain of the laminations.

Since numerous changes may be made in the above described apparatus and different embodiments of the invention may be made without departing from the spirit thereof, it is intended that all matter contained in the foregoing description or shown in the accompanying drawings shall be interpreted as illustrative and not in a limiting sense.

We claim as our invention:

1. A method of constructing a magnetic core having a plurality of superposed layers of assembled metallic laminations, comprising the steps of:
   providing a plurality of spaced dies,
   indexing a strip of metallic material into the dies,
   cutting the strip with the dies to provide a plurality of laminations,
   indexing certain of the dies a predetermined dimension transverse to the indexing direction of the strip of metallic material,
   indexing the strip of metallic material into the dies,
   cutting the strip with the dies to provide a plurality of laminations,
   repeating the steps of indexing the dies, indexing the strip, and cutting the strip with the dies, until the desired number of laminations is obtained,
   and assembling the laminations into superposed layers which define at least one closed loop, with at least certain of the joints between the laminations in each layer being offset from similar joints in the adjacent layers.

2. The method of claim 1 wherein the offset between the joints of adjacent layers is the predetermined die indexing dimension.

3. The method of claim 1 wherein each step of cutting the laminations provides the laminations required for a complete layer of the magnetic core.

4. The method of claim 1 wherein each step of cutting the laminations provides fewer laminations than required for a complete layer of the magnetic core, with the strip being repeatedly indexed and cut with certain of the dies until the laminations required for one layer are obtained, with the step of indexing the dies occurring each time the laminations required for one layer are obtained.

5. The method of claim 1 wherein each step of cutting the laminations provides fewer laminations than required for a complete layer of the magnetic core, with the strip being indexed and cut twice, using two different strip indexing increments, to obtain the laminations required for a complete layer, with the step of indexing the dies occurring each time the laminations required for a layer are obtained.

6. The method of claim 1 wherein the certain dies which are indexed, are indexed a predetermined number of times in one direction, and then returned to the starting positions to repeat the indexing pattern.

7. The method of claim 1 wherein the certain dies which are indexed, are indexed a predetermined number of times in one direction, and then are indexed a predetermined number of times back to their starting positions.

8. The method of claim 1 wherein the certain dies which are indexed include certain dies which index in a direction opposite to the direction of the remaining dies.

9. The method of claim 1 wherein the step of cutting the laminations with the dies provides four laminations, which complete a layer for single-phase magnetic core having two leg portions and two yoke portions.

10. The method of claim 1 wherein the step of cutting the laminations with the dies provides seven laminations, which complete a layer for a three-phase magnetic core having three leg portions and two divided yoke portions.

11. The method of claim 1 wherein each step of cutting the laminations provides fewer laminations than required for a complete layer of a three-phase magnetic core having seven laminations per layer, with the strip being indexed and cut first and second times using first and second different strip indexing increments, to obtain four and three laminations, respectively, and complete a layer of the core, with the step of indexing the dies occurring each time the seven laminations required for a complete layer are obtained.

12. The methods of claim 11 wherein first, second, third, fourth and fifth dies are provided, with the strip being cut the first time with the second, third, fourth and fifth dies, and with the strip being cut the second time with the first, second and third dies.

13. The method of claim 1 wherein the edge of at least one end of each of the laminations is perpendicular to the side of the metallic strip, and including the step of stacking like laminations after cutting, with the edge of the at least one perpendicular end being against a plane surface, to obtain stacked portions of the magnetic core having the edges of their laminations which are to butt against the edges of laminations of other stacked portions, offset from one another in a predetermined stepped pattern.

14. The method of claim 13 wherein the edge of the at least one end of each of the laminations which is perpendicular to the side of the metallic strip is the same relative end on each lamination.

15. The method of claim 13 wherein the edge of the at least one end which is perpendicular to the side of the metallic strip extends for less than the strip width on at least certain of the laminations, with the dimension of this edge changing from layer to layer of the magnetic core on the certain laminations, as the dies are indexed.

16. The method of claim 15 wherein the edges of the ends of the laminations which extend for less than the width of the metallic strip, fit the cut end of another lamination, when the laminations are assembled, to provide layers which have a rectangular outer configuration and a rectangular window.

17. The method of claim 16 wherein the layers are superposed during the assembly step, with the edges of the laminations in alignment, to provide a magnetic core which has a rectangular outer configuration and rectangular windows, with no voids or protrusions.

18. The method of claim 1 wherein the cutting step provides laminations wherein the leading edge of one lamination is the desired configuration of the trailing edge of the next lamination, to completely utilize the magnetic strip material in the cutting of the laminations.

References Cited
UNITED STATES PATENTS

| | | | |
|---|---|---|---|
| 2,407,625 | 9/1946 | Brand | 29—609 X |
| 3,214,718 | 10/1965 | Graham | 336—217 |
| 3,303,448 | 2/1967 | Farry | 29—609 X |
| 3,405,880 | 10/1968 | Bielert | 83—34 X |

JOHN F. CAMPBELL, Primary Examiner

C. E. HALL, Assistant Examiner

U.S. Cl. X.R.

29—602; 83—34, 217; 336—217